US006464743B2

(12) United States Patent
Kanno et al.

(10) Patent No.: US 6,464,743 B2
(45) Date of Patent: Oct. 15, 2002

(54) MOBILE TELECOMMUNICATION STATION

(75) Inventors: Hiroshi Kanno; Yuuichi Abe; Hiroshi Ito, all of Kawasaki; Tatsuo Hayashi, Tokyo, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/788,386

(22) Filed: Feb. 21, 2001

(65) Prior Publication Data

US 2001/0005679 A1 Jun. 28, 2001

Related U.S. Application Data

(63) Continuation of application No. 08/858,500, filed on May 19, 1997, now Pat. No. 6,212,373.

(30) Foreign Application Priority Data

Sep. 11, 1996 (JP) .............................................. 8-239631

(51) Int. Cl.⁷ ................................................. H04Q 7/20
(52) U.S. Cl. .......................... 55/450; 455/425; 455/419
(58) Field of Search ................................ 455/450, 403, 455/428, 425, 964, 965, 9, 515, 517, 419; 375/225, 254, 230, 232, 219, 220

(56) References Cited

U.S. PATENT DOCUMENTS

| | | | |
|---|---|---|---|
| 5,091,942 A | | 2/1992 | Dent |
| 5,159,611 A | * | 10/1992 | Tomita et al. ............... 375/254 |
| 5,404,355 A | | 4/1995 | Raith |
| 5,465,288 A | | 11/1995 | Falvey et al. |
| 5,528,668 A | | 6/1996 | Aihara |
| 5,568,654 A | | 10/1996 | Fukawa |
| 5,625,629 A | | 4/1997 | Wenk |
| 5,717,764 A | * | 2/1998 | Johnston et al. ................ 381/2 |
| 5,766,314 A | | 6/1998 | Kapadia et al. |
| 5,778,316 A | | 7/1998 | Persson et al. |
| 5,802,465 A | | 9/1998 | Hamalainen et al. |
| 5,844,885 A | | 12/1998 | Grob et al. |
| 5,864,757 A | | 1/1999 | Parker |
| 5,991,642 A | | 11/1999 | Watanabe et al. |
| 6,002,936 A | | 12/1999 | Carnall |
| 6,192,252 B1 | * | 2/2001 | Lysejko et al. .............. 455/512 |

* cited by examiner

*Primary Examiner*—Lee Nguyen
*Assistant Examiner*—Congvan Tran
(74) *Attorney, Agent, or Firm*—Staas & Halsey LLP

(57) ABSTRACT

A mobile telecommunication station which is connected to a mobile telecommunication network and is provided with a mobile telecommunication service from the network, providing a function enabling unit (for example a voice coding unit) with a function which is masked in advance and is enabled by release of the mask and a masking control unit for watching predetermined air interface information (for example a broadcast information) from the mobile telecommunication network and releasing the mask of the function enabling unit according to an instruction, in extended information elements thereof, for releasing the mask. A half rate mobile telecommunication unit capable of increasing for example a channel capacity can therefore be released on the market early without waiting for the completion of the entire system on the network side. When the network side system is completed, the potential half rate functions of the mobile telecommunication unit are revealed all at once. The large number of already sold half rate mobile telecommunication units of high frequency utilization efficiency consequently improve the efficiency of channel utilization greatly.

6 Claims, 17 Drawing Sheets

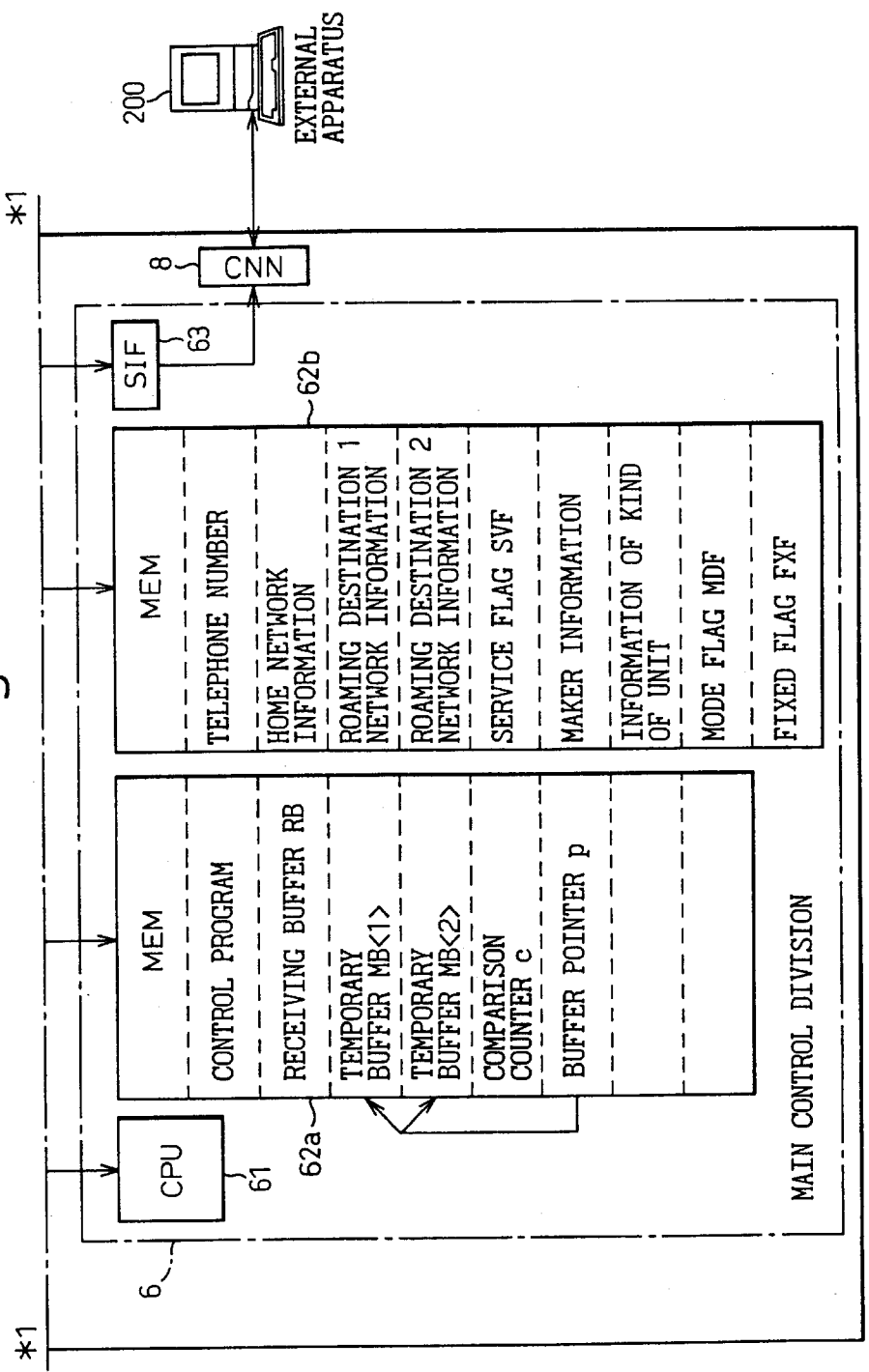

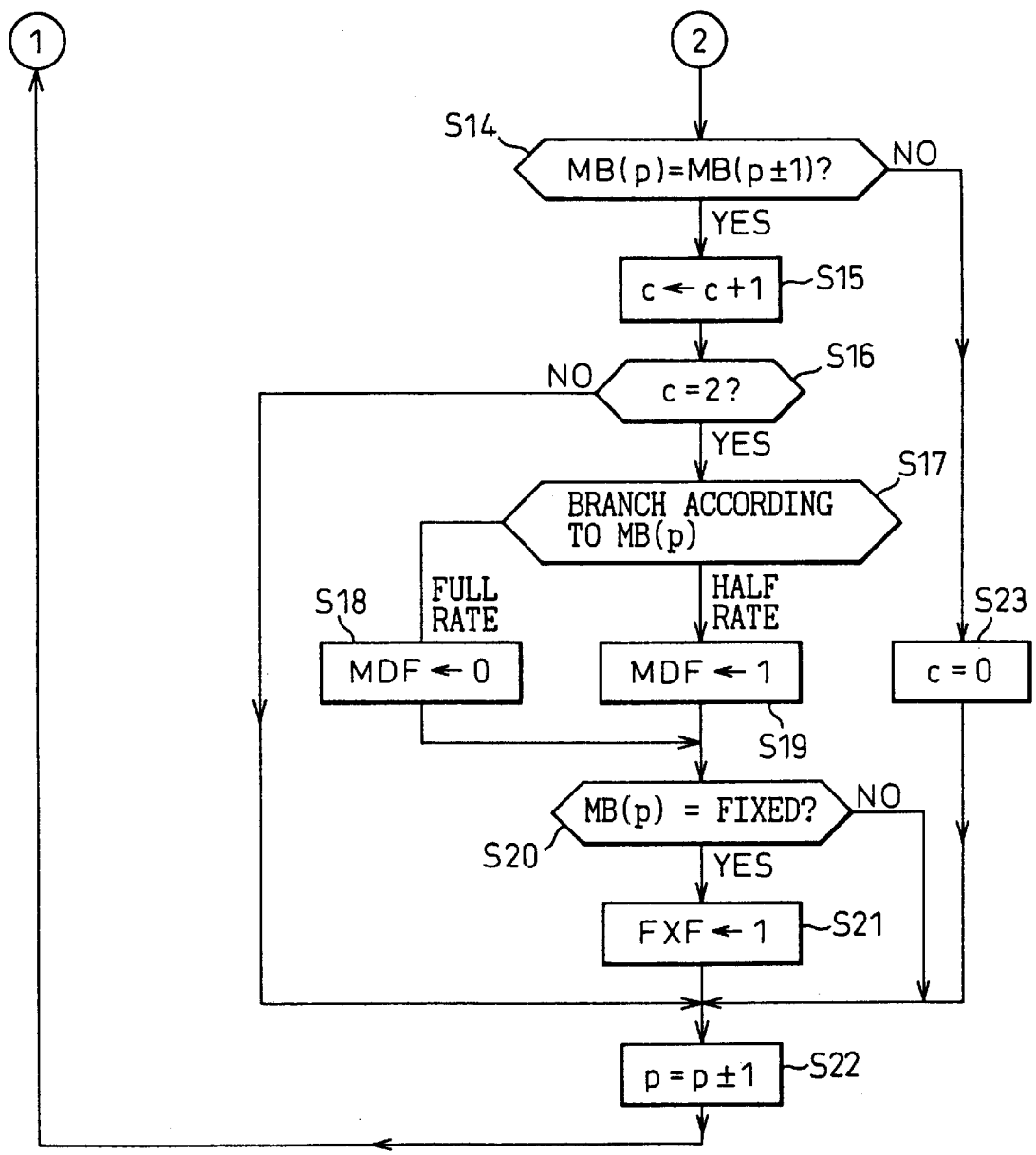

Fig. 5A

BROADCAST INFORMATION

| ITEM | INFORMATION ELEMENTS | REMARKS |
|---|---|---|
| 1 | TYPE OF MESSAGES | BROADCAST etc. |
| 2 | NETWORK NUMBER | NETWORK NUMBER OF CARRIER |
| 3 | REGULATION INFORMATION | CALL ORIGINATION REGULATION etc. |
| 4 | CONTROL CHANNEL CONFIGURATION INFORMATION | NUMBER OF CONTROL CHANNELS, etc. |
| 5 | MAXIMUM TRANSMISSION POWER OF MOBILE STATION | CONTROL CHANNEL USE |
| 6 | STANDBY ENABLING LEVEL | RECEIVING LEVEL FOR ENABLING STANDBY |
| 7 | STANDBY DISABLING LEVEL | RECEIVING LEVEL FOR DISABLING STANDBY |
| 8 | NUMBER OF MULTIPLEXING OF LOCATION REGISTRATION ZONES (N) | |
| 9 | LOCATION NUMBER | FIRST |
| | ⋮ | ⋮ |
| 10 | LOCATION NUMBER | N-th |
| 11 | NUMBER OF MAXIMUM BROADCAST CHANNELS | |
| 12 | NUMBER OF PERCH CHANNELS (N) | INSIDE ZONE/SECTOR JUDGING USE |
| 13 | PERCH CHANNEL NUMBER | FIRST |
| | ⋮ | ⋮ |
| 14 | PERCH CHANNEL NUMBER | N-th |
| 15 | LOCATION REGISTRATION TIMER | TIME INTERVAL OF LOCATION REGISTRATION |
| 16 | ELEMENT LENGTH OF EXTENDED INFORMATION | 0~255 |
| 17 | EXTENDED INFORMATION ELEMENT | OPERATOR OPTION |

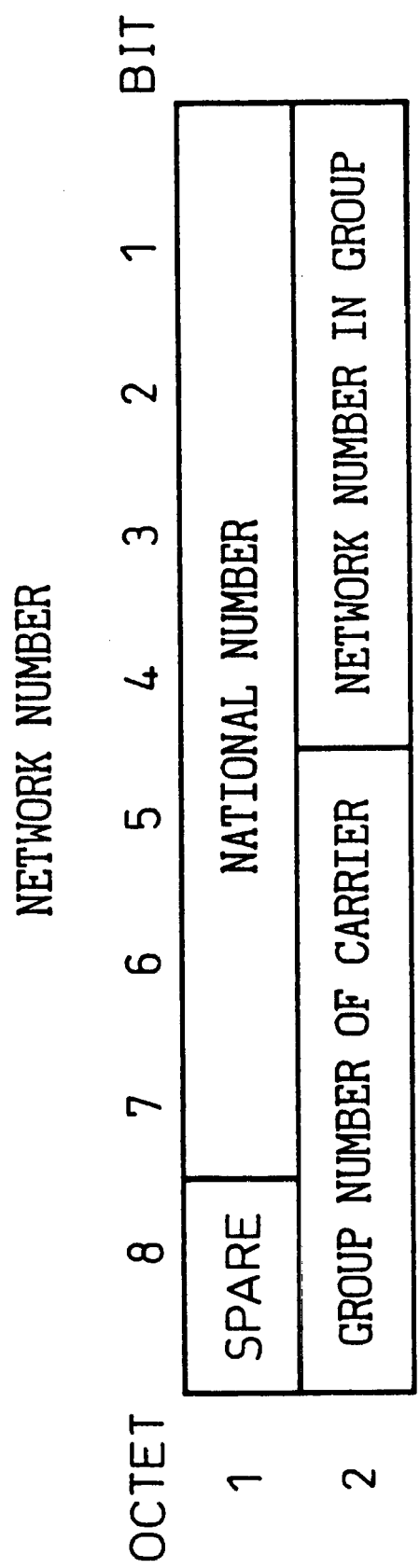

Fig.5C

EXPANDED INFORMATION

| ITEM | OCTET | 8 | 7 | 6 | 5 | 4 | 3 | 2 | 1 | BIT |
|---|---|---|---|---|---|---|---|---|---|---|
| 16 | ELEMENT LENGTH OF EXPANDED INFORMATION | 0 | 0 | 0 | 0 | 0 | 1 | 0 | 1 | |
| 17 | EXPANDED INFORMATION ELEMENT (1) | d2 | d1 | c2 | c1 | b2 | b1 | a2 | a1 | |
| 18 | EXPANDED INFORMATION ELEMENT (2) | h2 | h1 | g2 | g1 | f2 | f1 | e2 | e1 | |
| 19 | EXPANDED INFORMATION ELEMENT (3) | ℓ2 | ℓ1 | k2 | k1 | j2 | j1 | i2 | i1 | |
| 20 | EXPANDED INFORMATION ELEMENT (4) | p2 | p1 | o2 | o1 | n2 | n1 | m2 | m1 | |
| 21 | EXPANDED INFORMATION ELEMENT (5) | t2 | t1 | s2 | s1 | r2 | r1 | q2 | q1 | |

Fig. 8A

NOTIFICATION OF ORIGINATING
RADIO CONDITIONS

| ITEM | INFORMATION ELEMENTS | REMARKS |
|---|---|---|
| 1 | TYPE OF MESSAGE | ORIGINATION |
| 2 | TYPE OF MOBILE STATION | TRANSMISSION RATE etc. |
| 3 | RECEIVED LEVEL | RECEIVED LEVEL IN IT'S OWN ZONE |
| --- | --- | --- |

Fig. 8B

NOTIFICATION OF TERMINATING
RADIO CONDITIONS

| ITEM | INFORMATION ELEMENTS | REMARKS |
|---|---|---|
| 1 | TYPE OF MESSAGE | TERMINATION |
| 2 | TERMINATION IDENTIFICATION NUMBER | |
| 3 | TYPE OF MOBILE STATION | TRANSMISSION RATE etc. |
| --- | --- | --- |

Fig. 8C

SPECIFICATION OF RADIO CHANNEL

| ITEM | INFORMATION ELEMENTS | REMARKS |
|------|----------------------|---------|
| 1 | TYPE OF MESSAGE | SPECIFICATION OF RADIO CHANNEL |
| 2 | FREQUENCY CODE | |
| --- | --- | --- |
| 7 | CHANNEL INFORMATION | |

Fig.9A

TYPE OF MOBILE STATIONS

| OCTET | BIT 8 | 7 | 6 | 5 | 4 | 3 | 2 | 1 |
|---|---|---|---|---|---|---|---|---|
| 1 | CLASSIFICATION OF MOBILE STATION | | MAXIMUM TRANSMISSION POWER | | | TRANSMISSION RATE IN RADIO PATH | | |
| 2 | MOBILE STATION Rev | | | | STANDARD PRIVACY VERSION | | SPARE | |
| 3 | SPARE | | | OPERATOR'S OWN DEFINITION REGION | | | | |

001: FULL RATE
011: FULL RATE + HALF RATE
OTHERS: RESERVE

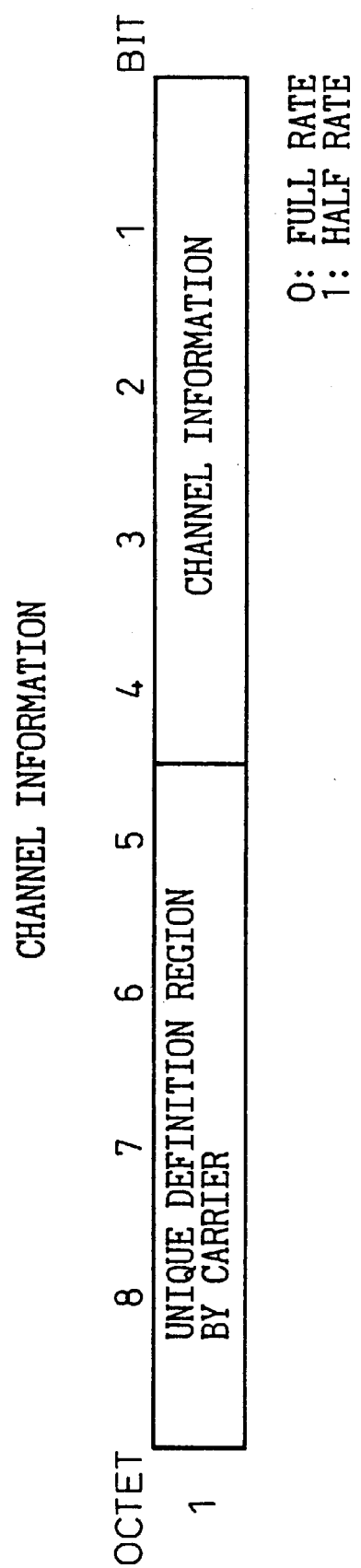

MOBILE TELECOMMUNICATION STATION

This application is a continuation of application Ser. No. 08/858,500, filed May 19, 1997 now U.S. Pat. No. 6,212,373, now allowed.

BACKGROUND OF THE INVENTION

1. Field of the Invention

The present invention relates to a mobile telecommunication station and, more particularly, to a mobile telecommunication station which is connected to a mobile telecommunication network and is provided with mobile telecommunication services from the network.

At the present time, the number of subscribers of mobile telephones, handheld telephones, and other telecommunications equipment is rapidly increasing. The systems are accordingly being strained to their limits in terms of channel capacity. To deal with this, the industry has come out with a plan to change the former full rate (11.2 kilobits/sec) communication speed using vector sum excited linear prediction (VSELP) to a half rate communication speed using PSI-code excited linear prediction (CELP) by voice signal compression technology. Quick completion of such a half rate system at the base station side is now being awaited.

2. Description of the Related Art

As will be explained in detail later by using the drawings, a base station specifies a full rate/half rate radio channel in accordance with the transmission rate of a mobile telecommunication unit. Responding to this, the mobile telecommunication unit performs the communication at the full rate or half rate. Accordingly, carriers are working to improve the functions of the base stations and, at the same time, sell half rate units so as to secure the required channel capacity.

In this type of communication system, however, it is necessary to fully confirm the air interface match between the base station and the mobile station in advance by using the actual network. At the very least, it is necessary to perform full confirmation tests for the basic functions of the cellular telephone set, that is, the call origination and termination processing, hand-off processing between cells, transmission power control, speech continuing processing, etc., by using an actual cellular network while taking into account the wave propagation characteristics.

For this reason, the half rate unit must be sold after being fully checked for operation when the system on the base station side is completed. Accordingly, it is not possible in practice to secure enough of a channel capacity to keep up with the rapid increase of the subscribers.

On the other hand, if the half rate unit were to be sold to the consumer without conducting a full confirmation test, not only might unexpected damage be given to the exchange, switching network, consumer, etc., but also it would be necessary to notify the subscribers by direct mails or the like and ask them to go to the service shop so as to change the functions (firmware or the like) of the once sold mobile telecommunication units. This would place a heavy burden on both of the consumer and the carrier performing the maintenance.

SUMMARY OF THE INVENTION

The term "RCR" stands for "Research and development Center for Radio System," which been established by a Japanese private association for the standardization of electronic communications in Japan.

The present invention was made in consideration of the above problem of the related art and has as an object thereof to provide a mobile telecommunication station with which the risk accompanying the enhancement of the functions of a mobile telecommunication network can be effectively avoided and, at the same time, the functions of the entire mobile telecommunication network can be smoothly enhanced.

To attain the above object, the present invention provides a mobile telecommunication station which is connected to a mobile telecommunication network and receives provision of mobile telecommunication services from the network, including a function enabling means (for example a voice coding means) with a function which is masked in advance and is enabled by release of the mask and a masking control means for watching predetermined air interface information (for example broadcast information) from the mobile telecommunication network and releasing the mask of the function enabling means based on an instruction for releasing the mask in extended information elements thereof. Thus a half rate mobile telecommunication unit capable of increasing the channel capacity can therefore be marketed early without waiting for the completion of the entire system on the network side. When the network side system is completed, the potential half rate functions of the mobile telecommunication unit are activated all at once. Consequently the large number of already sold half rate mobile telecommunication units of high frequency utilization efficiency greatly improve the efficiency of channel utilization.

BRIEF DESCRIPTION OF THE DRAWINGS

The above object and features of the present invention will be more apparent from the following description of the preferred embodiments given with reference to the accompanying drawings, wherein:

FIGS. 2A and 2B are views of the configuration of a mobile telecommunication station according to an embodiment of the present invention;

FIGS. 4A and 4B are flowcharts of the masking control processing according to the embodiment of the present invention;

FIGS. 5A, 5B, and 5C are views explaining broadcast information in the embodiment of the present invention;

FIGS. 8A to 8C are second views explaining the related art; and

FIGS. 9A and 9B are third views explaining the related art.

DESCRIPTION OF THE PREFERRED EMBODIMENTS

Figure 7:
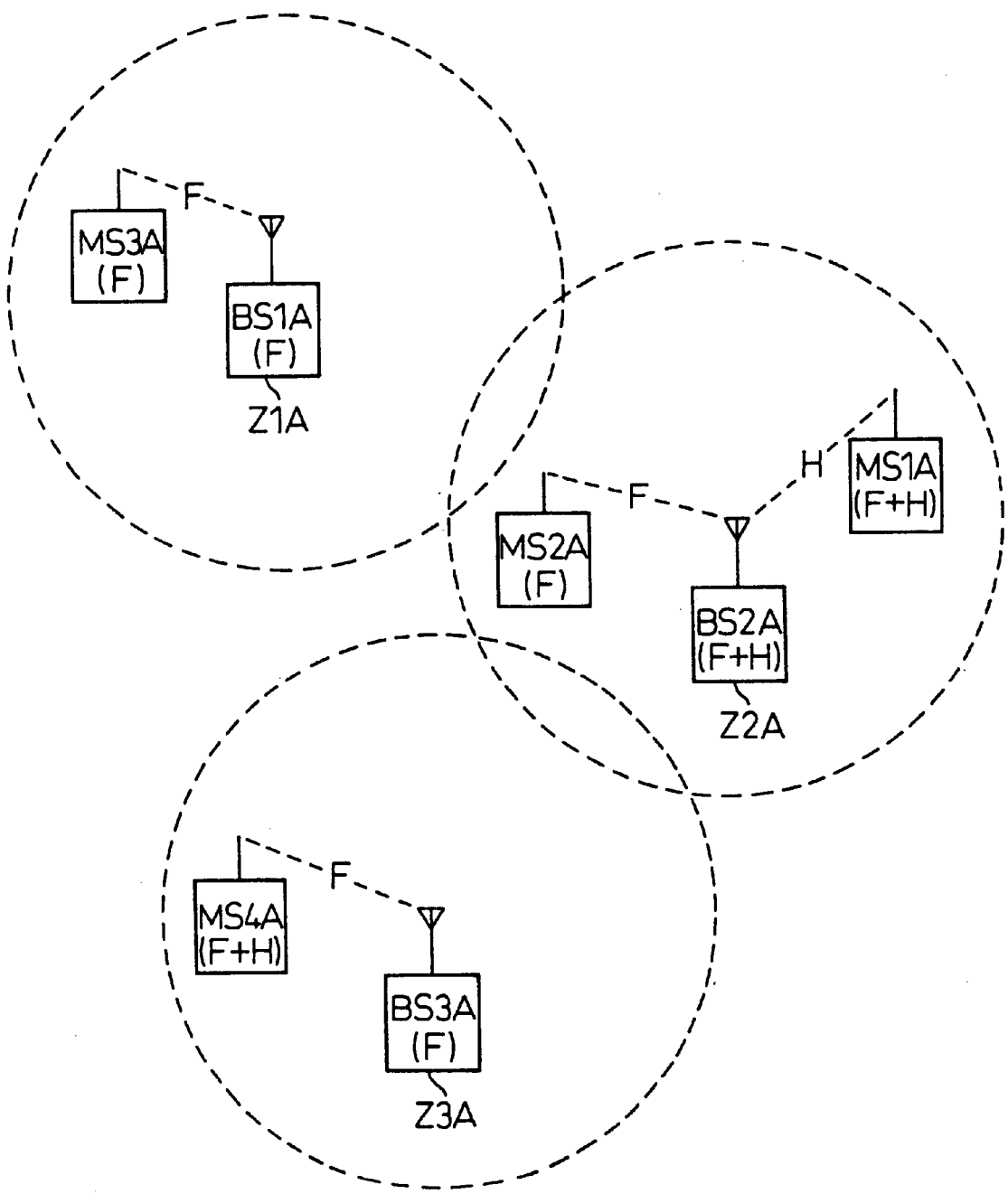
FIG. 7 is a first view explaining the related art.

FIG. 7, FIGS. 8A to 8C, and FIGS. 9A and 9B are veiws explaining the related art, in which FIG. 7 shows a cellular system mobile telecommunication network and FIGS. 8A to 8C and 9A and 9B show part of an RCR standard (digital mobile telephone system) on which this mobile telecommunication network is based.

According to this RCR standard, carriers are able to enhance the functions of the base stations (by handling half rate) and to mix the full rate mobile stations and half rate mobile stations (dual rate) together. Therefore, an increase of the half rate units and an increase of the channel capacity can be expected. This will be explained further below.

In FIG. 7, ZnA (n. 1, 2, . . . ) is a radio zone of a carrier A, BSnA is a base station of the carrier A, and MSnA is a mobile telecommunication unit subscribing to the carrier A (mobile telephone or handheld telephone). In the old model full rate base stations BS1A and BS3A, only full rate (F) communication (speech) service is possible. On the other hand, the new model half rate base station BS2A is enhanced in its functions and can provide half rate {that is, dual rate (F+H)} communication service. There are also two types of mobile telecommunication units, i.e., the old mode full rate units MS2A and MS3A and the new model half rate units (that is, dual rate units) MS1A and MS4A.

In such a mobile telecommunication network, the full rate unit MS3A inside the zone Z1A performs the communication with the BS1A at a full rate F as in the conventional manner. On the other hand, the half rate unit MS4A inside the zone Z3A can perform communication with BS3A at the full rate F. Further, the full rate unit MS2A inside the zone Z2A can perform communication with BS2A at the full rate F, and the half rate unit MS1A can perform communication with BS2A at a half rate H.

Such a selection of the transmission rate in the base station is based on the RCR standard and performed in the following way.

The mobile station transmits a "NOTIFICATION OF ORIGINATING RADIO CONDITIONS" to the base station at the time of origination of a call. The base station receiving this can determine the transmission rate of the originating mobile station based on the information of the "TYPE OF-MOBILE-STATION" contained in the "NOTIFICATION OF ORIGINATING RADIO CONDITIONS".

FIG. 8A shows part of the signal format of the "NOTIFICATION OF ORIGINATING RADIO CONDITIONS".

In this case,the "TYPE OF MESSAGE" is 01H (notification of originating radio conditions). Here, H indicates a hexadecimal notation. Further, the item "TYPE OF MOBILE STATION" is contained.

FIG. 9A shows the signal format of the "TYPE OF MOBILE STATION".

Here, the item "TRANSMISSION RATE IN RADIO PATH" is contained in the octet 1. The lower 3 bits are 001 in the case of a full rate unit and are 011 in the case of a half rate unit. The other bits are held in reserve.

On the other hand, at the time of call termination at the mobile station, in response to paging (simultaneous call) from the base station, the mobile station transmits a "NOTIFICATION OF TERMINATING RADIO CONDITIONS" to the base station. The base station receiving this can determine the transmission rate of the terminating terminating mobile station according to the above "TYPE OF MOBILE STATION" contained in the "NOTIFICATION OF TERMINATING RADIO CONDITIONS".

FIG. 8B shows part of the signal format of the "NOTIFICATION OF TERMINATING RADIO CONDITIONS".

In this case, the "TYPE OF MESSAGE" is 03H (notification of terminating ratio conditions). The item "TYPE OF MOBILE STATION" is contained here too.

In each of the above cases, the base station transmits a "SPECIFICATION OF RADIO CHANNEL" to the mobile station at the time of setting up the speech channel.

FIG. 8C shows a part of the signal format of the "SPECIFICATION OF RADIO CHANNEL".

In this case, the "TYPE OF MESSAGE" is 43H (specification of ratio channel). The item "CHANNEL INFORMATION" is contained here.

FIG. 9B shows the signal format of the "CHANNEL INFORMATION".

The item "CHANNEL INFORMATION" is contained here. The lower bit thereof is 0 in the case of specification of the full rate and is 1 in the case of specification of the half rate.

In this way, the base station specifies a full rate or half rate radio channel in accordance with the transmission rate of the mobile telecommunication unit, while the mobile telecommunication unit receiving this performs the full rate or half rate communication. Accordingly, the carriers can enhance the functions of the base stations and, at the same time, sell half rate units and thereby secure the required channel capacity.

In this type of communication system, however, as already mentioned, it is necessary to fully confirm the air interface match between the base station and the mobile station in advance by using the actual network. At the very least, it is necessary to perform full confirmation tests for the basic functions of the cellular telephone set, that is, the call origination and termination processing, hand-off processing between cells, transmission power control, speech continuing processing, etc., by using an actual cellular network while taking into account the wave propagation characteristics.

For this reason, the half rate unit must be sold after being fully checked for operation when the system on the base station side is completed. Accordingly, it is not possible in practice to secure enough of a channel capacity to keep up with the rapid increase of the subscribers.

On the other hand, if the half rate unit were to be sold to the consumer without conducting a full confirmation test, not only might unexpected damage be given to the exchange, switching network, consumer, etc., but also it would be necessary to notify the subscribers by direct mails or the like and ask them to go to the service shop so as to change the functions (firmware or the like) of the once sold mobile telecommunication units. This would place a heavy burden on both of the consumer and the carrier performing the maintenance.

In order to solve the above identified conventional problems. the present invention provides a mobile telecommunication station with which the risk accompanying the enhancement of the functions of a mobile telecommunication network can be effectively avoided and, at the same time, the functions of the entire mobile telecommunication network can be smoothly enhanced.

Figure 1:
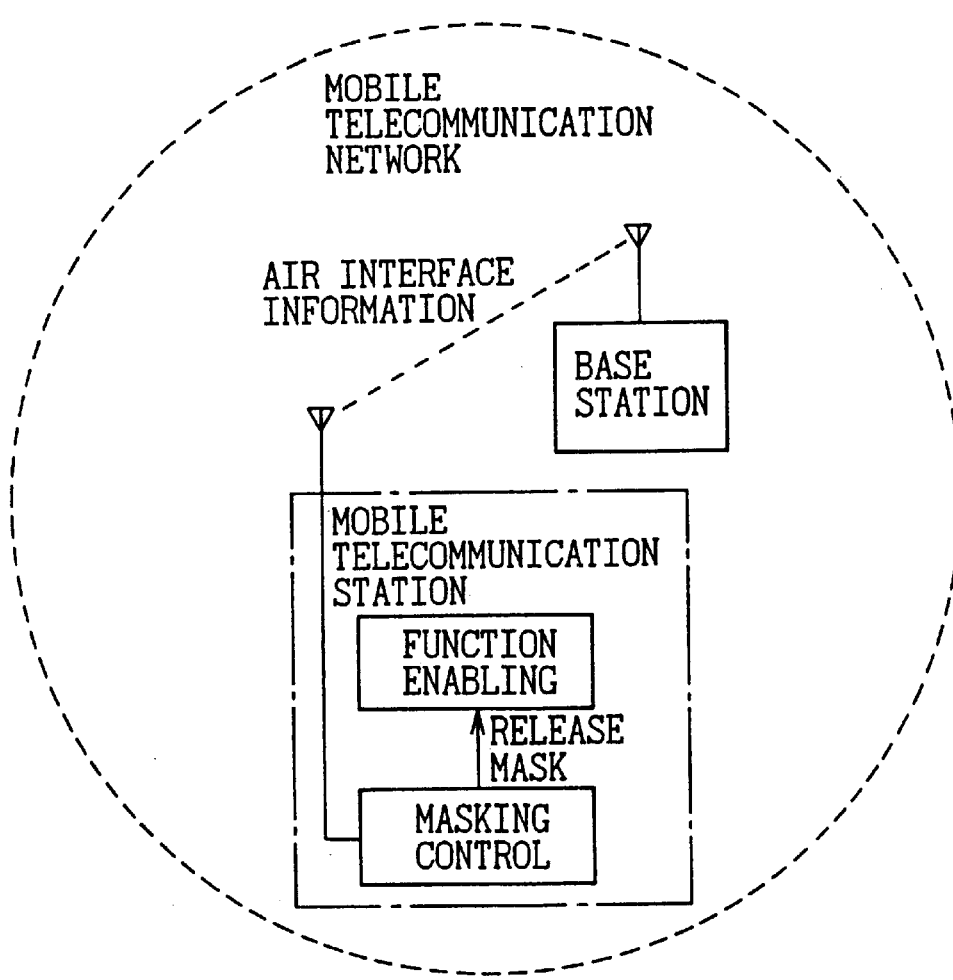
FIG. 1 is a view explaining a principle of the present invention.

The above problem is solved by the configuration of, for example, FIG. 1. That is, a mobile telecommunication station which is connected to a mobile telecommunication network and receives provisions of mobile telecommunication services from the network, according to a first aspect, including a function enabling means (for example a voice coding means) with a function which is masked in advance and is enabled by release of the mask and a masking control means for watching predetermined air interface information (for example broadcast information) from the mobile telecommunication network and releasing the mask of the function enabling means based on an instruction, in extended information elements, for releasing the mask thereof.

In order to smoothly enhance the functions of the entire mobile telecommunication network comprising the network side and a large number of terminals, it is considered necessary and effective to circulate mass production type mobile telecommunication units potentially provided with the new functions in the market early before the start of new services. This is because if a half rate mobile telecommunication unit enabling an increase of the channel capacity is marketed early without waiting for the completion of the system on the base station side, it is possible to activate the potential half rate functions of the mobile telecommunication units all at once at the point of time when the base station side system is completed. The large number of already sold half rate mobile telecommunication units of high frequency utilization efficiency therefore greatly improve the efficiency of channel utilization.

In this regard, the mobile telecommunication station of the first aspect of the present invention is provided with a function enabling means with a function which is masked in advance and is enabled by release of the mask and a masking control means for watching predetermined air interface information from the mobile telecommunication network and releasing the mask of the function enabling means based on an instruction for releasing the mask in extended information elements thereof. Thus even if a large number of such mobile telecommunication units are marketed in advance, not only is no confusion caused in the already existing mobile telecommunication network, but also the entire mobile telecommunication network can be enhanced in its functions smoothly and all together by the simultaneous release of the masks at the point of time when the base station side system is completed.

Preferably, in a second aspect of the present invention, the predetermined air interface information of the present invention is broadcast information in the control information transmitted from the base station in the mobile telecommunication network. Since broadcast information is always received by the mobile telecommunication unit inside a zone, the mask of the mobile telecommunication units can be efficiently and reliably released.

Further, preferably, in a third aspect of the present invention, the function enabling means in the first aspect of the present invention is a means related to compression/expansion of the voice data. Accordingly, in the mobile telecommunication network, for example, a change from a full rate unit to a half rate unit can be efficiently and smoothly carried out.

Further, preferably, in a fourth aspect of the present invention, the masking control means fixes the setup or release state of the mask in the function enabling means based on an instruction, in the expanded information elements, for fixing the mask. When the setup or release state of the mask is fixed, not only is it not necessary to perform the masking control later, but also the mobile telecommunication unit can be semi-permanently stabilized (fixed).

In some cases, however, an inconvenience is found in the same model regarding a match with a base station by, e.g., a different actual network test. In such a case, according to the fourth aspect of the present invention, it is possible to merely send to a mobile telecommunication unit with masked functions already circulating on the market an instruction for fixing the the mask, which instruction can even consist of a small number of bits, for example, one bit, from the network side so as to prevent, by remote control, the new functions (half rate function etc.) of the mobile telecommunication unit from being used semi-permanently. In this case, since this type of mobile telecommunication unit circulates in the market as one which does not appear to be provided with the new functions, it does not cause the subscribers any disadvantage. On the other hand, since the carrier does not have to perform any maintenance, it is possible to avoid an additional work load. Further, it is possible to merely send a mobile telecommunication unit with a mask released after circulating on the market an instruction for fixing the mask, which instruction can even include a small number of bits, for example, one bit, from the network side so as to fix the mobile telecommunication unit while enabling the new functions.

Preferably, in a fifth aspect of the present invention, the masking control means sets the mask of the function enabling means based on an instruction, in the expanded information elements, for setting the mask.

In this type of mobile telecommunication unit, it is convenient if it is possible to release the mask of the new functions of a mobile telecommunication unit which already circulated on the market or is being separately test-operated so as to test the channel connectivity and the speech quality in an actual network. Further if, it were possible to reset the mask when some unforeseen problem arose, it would be possible to effectively avoid causing confusion in the actual network. Further, by solving the problems at an early stage, it becomes possible to make improvements to the products to be marketed next earlier. In this regard, according to the fifth aspect of the present invention, even if the mask is remotely released, the mask can be remotely set up again. Therefore even if a problem occurs after the release of the mask, the mobile telecommunication unit can be easily returned to its original state.

In a sixth aspect of the present invention, the masking control means maintains the state of the setup or release of the mask of the function enabling means based on an instruction, in the expanded information elements, for maintaining the mask.

When only a command for setup or release of the mask can be sent from the network side, there arises a concern about whether these commands can be normally received by the mobile telecommunication unit via the predetermined air interface. According to the sixth aspect of the present invention, since the masking control means maintains the setup or release state of the mask based on an instruction for maintaining the mask from the network side, the air interface can be confirmed without changing the state of the mobile telecommunication unit. Further, on the network side, the masking control means can be utilized so as to send this mask maintaining instruction for preparation before the mask release.

In a seventh aspect of the present invention, the masking control means sets up and fixes the mask of the function enabling means based on an instruction, in the expanded information elements, for fixing the setup of the mask. Accordingly, the mobile telecommunication unit can be fixed to the setup state of the mask regardless of the state of the mobile telecommunication unit.

In an eighth aspect of the present invention, the masking control means fixes the release of the mask of the function enabling means based on an instruction, in the expanded information elements, for fixing the release of the mask. Accordingly, the mobile telecommunication unit can be fixed to the state of release of the mask regardless of the state of the mobile telecommunication unit.

In a ninth aspect of the present invention, the masking control means in the fourth, seventh, or eighth aspect of the present invention does not watch the expanded information elements after fixing the mask. Accordingly, on the mobile telecommunication unit side, the processing load of the CPU after the fixing of the mask is greatly reduced. On the other hand, when viewing this from the system side, the predetermined air interface information (for example broadcast information) can be reused again for another purpose in the future.

In a 10th aspect of the present invention, the masking control means operates based on the predetermined air interface information received from a specific carrier to which the station subscribes. Accordingly, on the mobile telecommunication unit side, the air interface information (expanded information element) of the same type or different type from the other carriers can be effectively filtered.

In an 11th aspect of the present invention, the masking control means operates based on the predetermined air interface information received from the home network. Accordingly, on the mobile telecommunication unit side, the air interface information (expanded information element) of same type or different type from the other carriers can be effectively filtered.

In preferably, in a 12th aspect of the present invention, the masking control means can identify the instruction information contained in the expanded information elements for each manufacturer of the station and/or each model of the station.

For this reason, on the network side, a large number and/or a larger number of types of command information for different manufacturers and/or models can be simultaneously placed in one set of the expanded information elements. Accordingly, a large number of mobile telecommunication units for each manufacturer and/or model which have been already released in the market can be efficiently masked by remote control.

In a 13th aspect of the present invention, provision is further made of an interface unit connected to an external apparatus by cable and, further, the mask of the function enabling means is set up or released based on an instruction for setup or release of the mask from the external apparatus.

This is preferable in that, in the operation of this type of mobile telecommunication network, even when the functions of the mobile telecommunication unit have been once fixed via the air interface, the masking control of the mobile telecommunication unit can be changed as desired by the external apparatus via the separately provided interface unit, if necessary.

Below, preferred embodiments of the present invention will be explained in further detail according to the attached drawings.

Figure 2A:
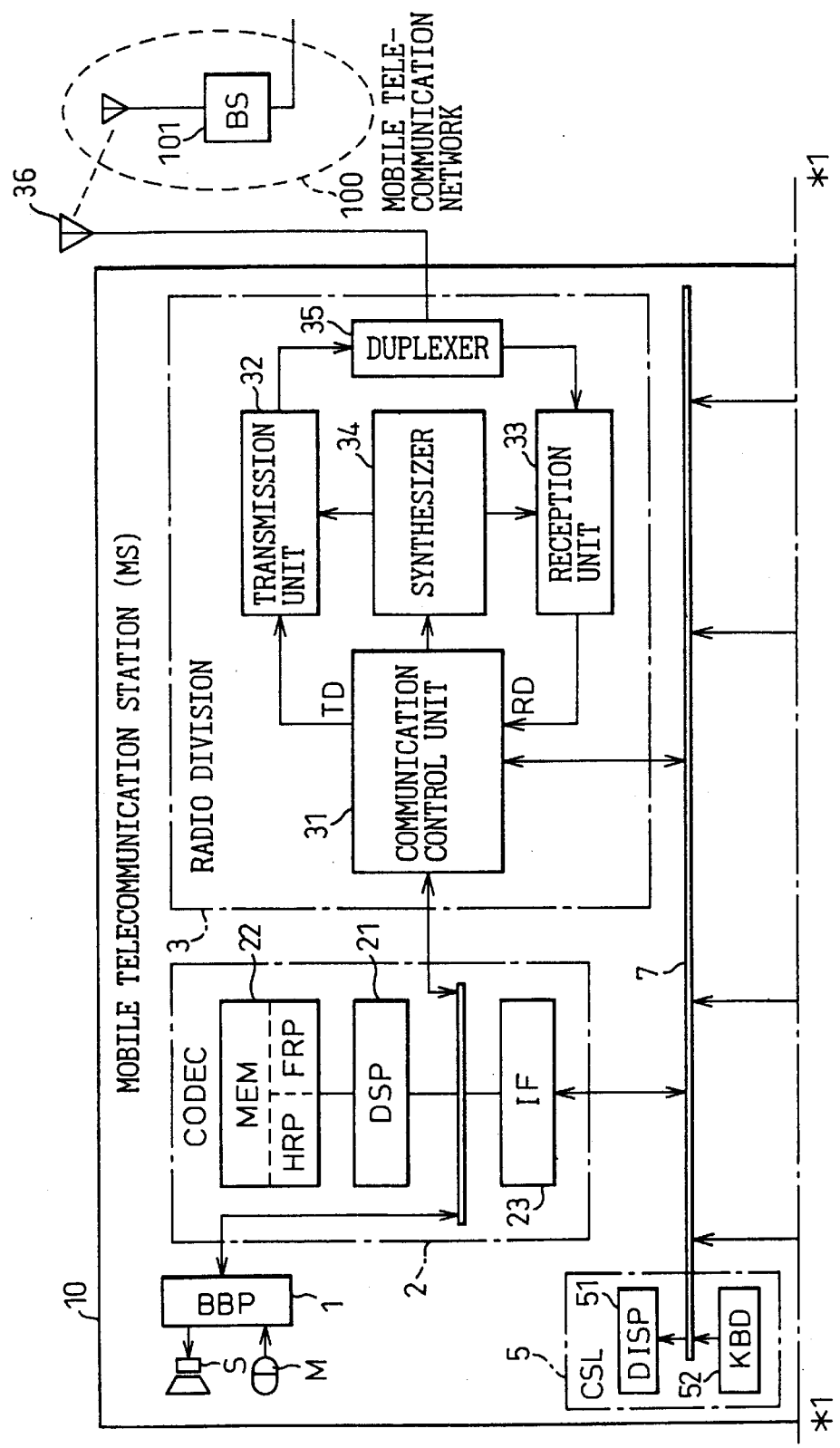

FIGS. 2A and 2B are views showing the configuration of a mobile telecommunication station according to an embodiment of the present invention. In the figures, 10 is a mobile telecommunication station (MS), 100 is a cellular system mobile telecommunication network, 101 is a base station (BS), and 200 is an external apparatus such as a personal computer.

In the mobile telecommunication station (mobile telecommunication unit) 10, S is a speaker, M a microphone, 1 a baseband processing unit (BBP) performing the baseband processing of the voice signal, 2 a codec performing a code conversion between the PCM code for the voice and data compression code for communication, 3 a radio division, 31 a communication control unit using for example a TDMA system, 32 a transmission unit using for example a π/4 shift QPSK mode, 33 a reception unit according to the same, 34 a frequency synthesizer, 35 an antenna duplexer, 36 a transmission reception antenna, 5 a console unit (CSL) located at the front part of the station, 51 a display unit (DISP) of the liquid crystal or other system, 52 a keyboard unit (KBD) provided with a dial key or various types of control keys, 6 a main control division performing the main control of the station, 61 a CPU, 62a a main memory (MEM) comprising, for example, a RAM and ROM, 62b a memory (MEM) comprising a nonvolatile memory (EEPROM etc.), 63 a serial interface unit (SIF), 7 a common bus of the CPU 61, and 8 a 16-pin standard connector (CNN) connected to the serial interface unit 63.

In the codec 2, 21 is a digital signal processor (DSP), 22 a program memory comprising a ROM and RAM, and 23 an interface unit (IF) for connection to the CPU 61. The memory 22 is provided with a processor unit (firmware) FRP of a full rate transmission speed (11.2 kilobits/sec) according to the VSELP type coding mode and a processor unit HRP of a half rate transmission speed (5.6 kilobits/sec) according to the PSI-CELP (code excited linear predictive coding) type coding mode. The DSP 21 performs the codec processing with the full rate processor unit FRP or the half rate processor unit HRP according to an instruction from the CPU 61.

Figure 4A:
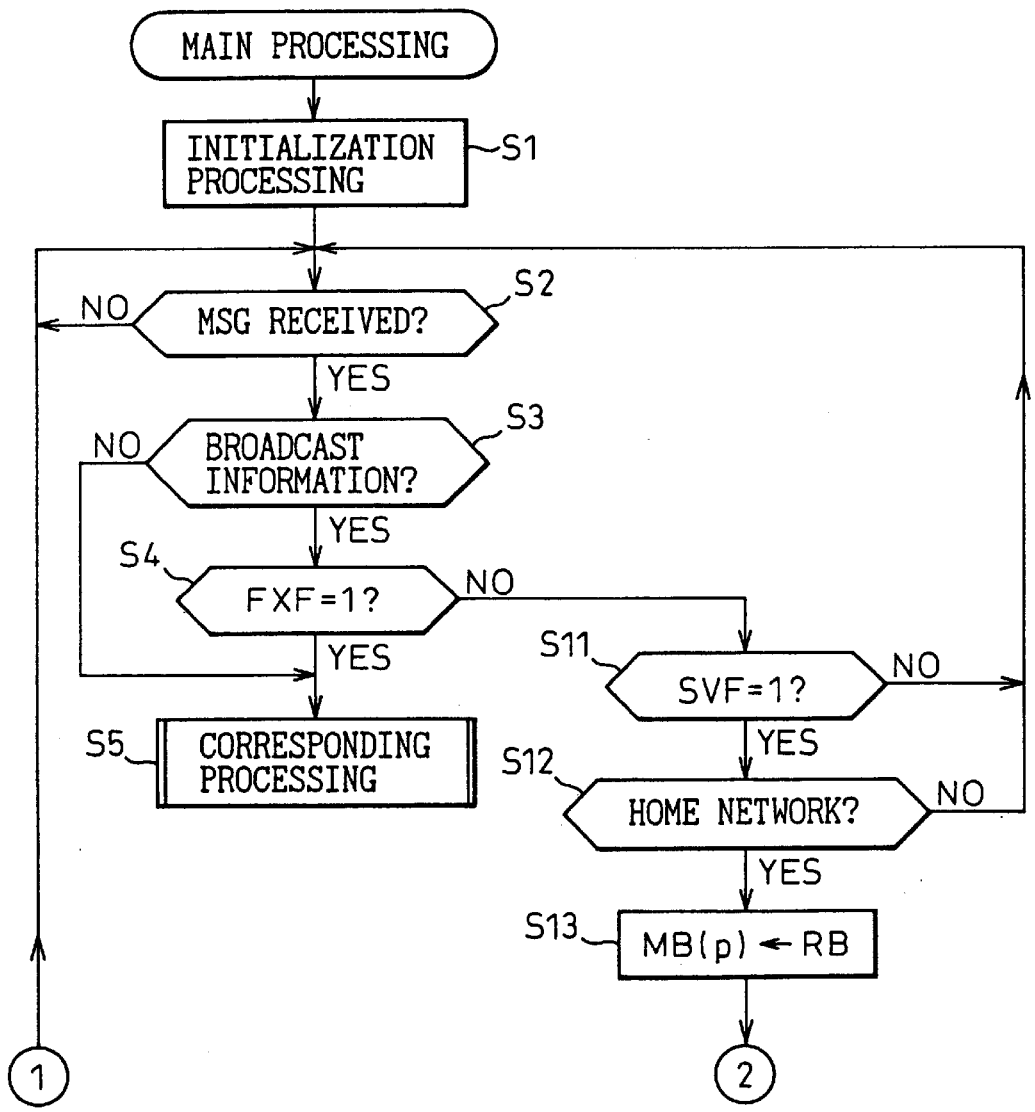

The main memory 62a is provided with a receiving buffer RB for storing the masking control program shown in for example FIGS. 4A and 4B and a received message from the base station, a first temporary buffer MB <1> for storing contents of the broadcast information, a second temporary buffer MB <2> for the same purpose, a comparison counter c for counting the number of times of coincidence in the comparison between the previous broadcast information (instruction in the expanded information elements) and the current broadcast information (instruction in the expanded information elements), and a pointer p for switching the storage destinations MB<1>/<2> of the current broadcast information. The contents of the main memory 62a have been written at the manufacturer.

The memory 62b is provided with a telephone number of the mobile telecommunication unit, a home network information indicating the first channel contractor (communication carrier) of the mobile telecommunication unit, a roaming destination 1 network information, a roaming destination 2 network information, etc., service flag SVF for indicating a fact that this mobile telecommunication unit is the object of the masking control service by the first communication carrier, a maker information of the manufacturer who made the mobile telecommunication unit, a mode flag MDF for setting and holding the information of the model indicating the model number of the mobile telecommunication unit and whether this mobile telecommunication unit (classification of mobile telecommunication unit) is a full rate unit or a half rate unit (that is a dual rate unit) on the air interface (originating/terminating radio notification etc.), and a fixed flag FXF indicating whether or not the operation mode is to be fixed. Usually, the telephone number to the service flag SVF among the contents of the memory 62b have been written by the first communication carrier selling the mobile telecommunication unit. Further, the mode flag MDF=0 (full rate unit) and the fixed flag FXF=0 (nonfixing) have been written by the maker.

This type of mobile telecommunication unit is released in the market seemingly as a full rate unit even though it is provided with the half rate function, where the half rate function thereof is preserved. Then, preferably, when full actual network tests of a specific group of mobile telecommunication units give conclusive evidence of normal operation under this half rate function, it becomes possible to activate (enable) the half rate functions of a large number of units which have already Bacon released oh the market all at once by utilizing the public radio waves (air interface) at an appropriate time rather than by utilizing another medium. This will be explained in detail below.

Figure 3A:
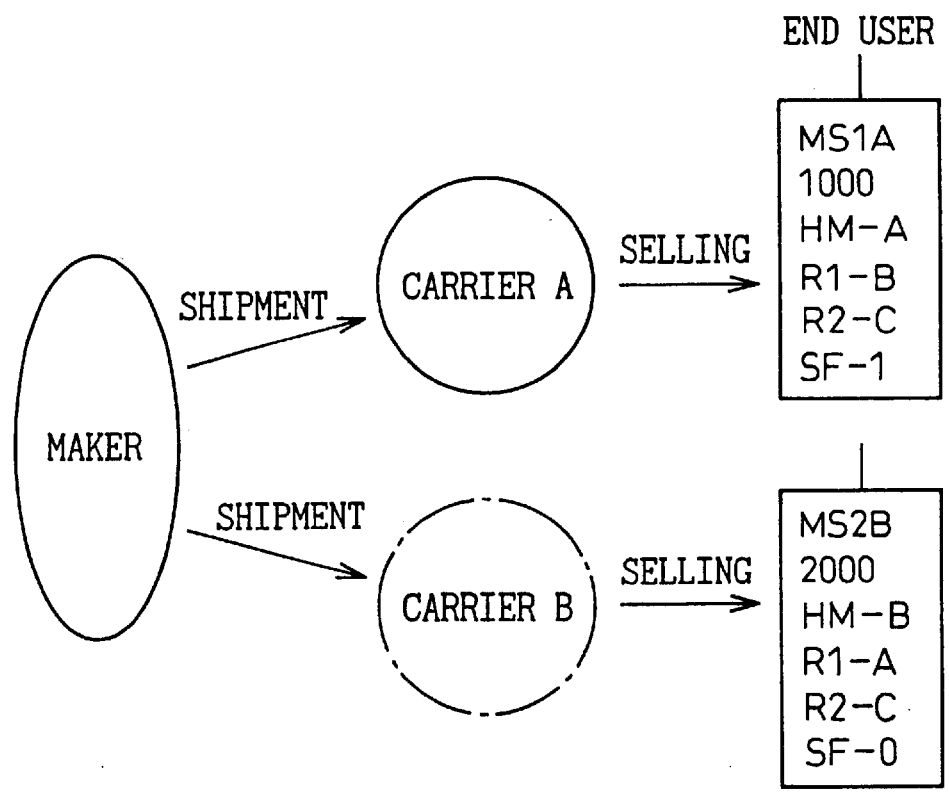
FIGS. 3A and 3B are views explaining a masking control processing according to an embodiment of the present invention.
Figure 3B:
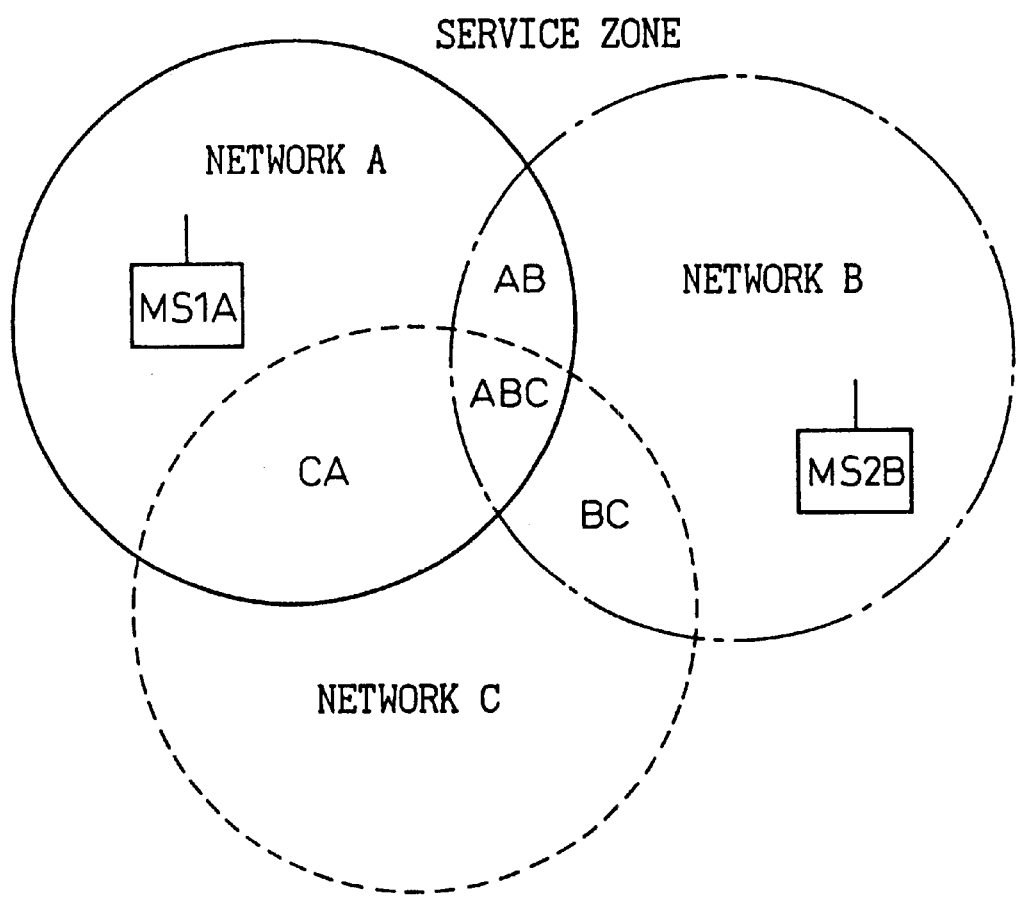

FIGS. 3A and 3B are views explaining the masking control processing according to the embodiment of the present invention.

The manufacturer produces the half rate (dual rate) unit according to the present embodiment and ships it to the communication carriers A and B. In this state, the half rate function is masked and only the full rate function operates. Namely, this mobile telecommunication unit appears to be a full rate unit and is preferably sold to the end user as a full rate unit.

The communication carrier A is the carrier providing the remote masking control service and writes a telephone number (=1000) of the mobile telecommunication unit, home network information HM (=carrier A), roaming destination 1 network information R1 (=carrier B), roaming destination 2 network information R2 (=carrier C), etc. in the memory 62b based on the subscriber contract with the end user. Note that the number of the roaming destinations is not limited to this. Further, this unit is a mobile telecommunication unit capable of receiving the remote masking control service of the carrier A, therefore the service flag SVF of this is made 1 (a service is to be provided). After this, the mobile telecommunication unit,MS1A is sold by the carrier A in this manner.

The communication carrier B sells a mobile telecommunication unit of the same type as that of the carrier A, but is not a carrier providing the above remote masking control service. In this case, based on the subscriber contract with the end user, a telephone number (=2000) of the mobile telecommunication unit, home network information HM (=carrier B), roaming destination 1 network information R1 (=carrier A), roaming destination 2 network information R2 (=carrier C), etc. are written in the memory 62b. Further, since the carrier B does not have to provide the related remote masking control service, the service flag SVF thereof is made 0 (no service). Note that in practice, the SVF is set to 0 in advance by the manufacturer, the carrier B disregard column of SVF. The mobile telecommunication unit MS2B is sold by the carrier B in this way.

Note that the carrier B can provide the above remote masking control service based on a contract with the carrier A. In this case, the service flag SVF in the mobile telecommunication unit MS2B is made 1 and the remote masking control service is separately provided from the home network (carrier B). However, in the following explanation, only the carrier A provides the remote masking control service.

The above sold mobile telecommunication units MS1A and MS2B are used thereafter in the mobile telecommunication network and are subject to the following remote masking control based on the broadcast information.

FIGS. 4A and 4B are flowcharts of the masking control processing according to the embodiment of the present invention.

When the mobile telecommunication unit is powered on, it enters the main processing. In this main processing, although not illustrated, the call originating/terminating processing and radio channel specification processing similar to those explained in the related art are carried out. Further, the usual processing of broadcast information is carried out. However, the processes relating to the masking control processing will however be primarily explained here.

At step S1, the required initialization processing is carried out. For example, the initialization is made such as receiving buffer RB=Null, timing buffers MB <1>, <2>=Null, comparison counter c=0, and pointer p =0 which specifies the MB <1>. On the other hand, the mode flag MDF, fixed flag FXF, service flag SVF, etc. have been stored in the data writable nonvolatile memory (EEPROM) 62b, namely initialized to MDF=0 (full rate unit), FXF=0 (not fixed), and SVF=1 (masking control service is to be provided) in advance by the manufacturer. The flag information is not lost even if the power supply is turned ON or OFF.

At step S2, the receipt of a message from the base station is awaited. When some message is received after a while, this message is stored in the receiving buffer RB. At step S3, it is decided whether the received message is the broadcast information. Where it is not the broadcast information (paging information or the like), the flow of processing proceeds to step S5, at which the corresponding processing is carried out.

Further, where the received message is the broadcast information, it is further decided at step S4 whether the fixed flag FXF is 1 (fixed). Where FXF is 1, this mobile telecommunication unit has been already fixed in its function to a full rate unit or a half rate (dual rate) unit, therefore the flow of processing proceeds to step S5, at which the usual processing of broadcast information is carried out.

However, when the mobile telecommunication unit was first purchased, FXF was 0 (not fixed). The flow proceeds to the masking control processing which starts from step S11, where it is decided first whether the service flag SVF is 1. Where SVF is 0 (no service), the mobile telecommunication unit is not one purchased from the specific carrier A providing the above remote masking control service, accordingly there is no needed to perform the following masking control processing and therefore the flow of processing returns to step S2. Note that, if the usual processing of broadcast information is necessary in this case, the flow of processing returns to step S5. Note that the mobile telecommunication unit MS2B of FIGS. 3A and 3B corresponds to this.

Further, where SVF is 1 (service is to be provided), the mobile telecommunication unit is one purchased from the specific carrier A, therefore it is further decided at step S12 whether or not the signal is received in the home network. The mobile telecommunication unit MS1A in FIGS. 3A and 3B corresponds to this.

In FIG. 3B, the mobile telecommunication unit MS1A of the carrier A roams in the home network A (determined to be the standby channel), but where it is roaming in another network B or C, it does not exist in the home network A. Note that although depending on the contract among the carriers, when the MS1A roams in a part AB, CA, or ABC where the networks overlap, usually the connection is allowed to the home network A with highest priority. Namely, in this case, the MS1A roams in the home network A.

Where, according to the decision at step S12, the signal is not received in the home network, the mobile telecommunication unit will not receive the masking control service from the other carriers, therefore the flow of processing returns to step S2 or S5. Further, where the signal is received in the home network, the processing proceeds to step S13. Here, the method of decision of step S12 will be concretely explained.

FIG. 5A shows the signal format of the "BROADCAST INFORMATION" in the embodiment of the present invention. This broadcast information is sent from the base station to the mobile station. In this case, the "TYPE OF MESSAGE" in item 1 is A1H (broadcast information) and the "NETWORK NUMBER" is contained in item 2. FIG. 5B shows the signal format of the "NETWORK NUMBER". Here, the "NATIONAL NUMBER" is 01H which indicates JAPAN. The rest of the bits are held in reserve. The "GROUP NUMBER OF CARRIER"=(0 to 15) is the number for identifying the carriers A, B, and C, and the "NETWORK NUMBER IN GROUP" (=0 to 15) is the number for identifying the local. networks of the carrier group.

Accordingly, the decision at step S12 (FIG. 4A) is easily carried out by comparing the "GROUP NUMBER OF CARRIER" of the received broadcast information and the "HOME NETWORK INFORMATION" in the memory 62b. When the result of the comparison is a match, the signal is received in the home network. When the result of comparison is not a match, the signal is not received in the home network.

Note that, although the mobile telecommunication unit MS2B roams in the home network B, but the processing is returned to step S2 or S5 due to the service flag SVF being 0.

At step S13, the contents of the receiving buffer RB (expanded information elements) are transferred to the temporary buffer MB (p). The pointer p in this case specifies the temporary buffer MB <1>at first. The expanded information elements are fields that the carriers can freely use.

FIG. 5C shows the signal format of an example of the expanded information elements.

For example, the "LENGTH OF EXPANDED INFORMATION ELEMENT" of item 16 is made 05H, and the command information a to t concerning the masking control of the mobile telecommunication unit are contained in the five octets, after the item 16, of expanded information elements (1) to (5). Two bits each of this command information are allotted for each manufacturer and/or model. For example, the mobile telecommunication unit MS1A corresponds to a model a of a certain manufacturer. The command issued to this is placed on the bits a2 and a1 in the expanded information elements. Further, a command issued to the model b by the same manufacturer is placed on the bits b2 and b1 in the expanded information elements. The commands of other manufacturers can be mixed in the expanded information elements. For example, a command issued to a mobile telecommunication unit (unit kind r) of another manufacturer is placed on the bits r2 and r1 in the expanded information elements.

From the carriers' viewpoint, this means that they can sell a large amount of this type of mobile telecommunication units by a plurality of manufacturers and of a plurality of models in a certain period. Therefore, preferably, it would be efficient if part or all of them can be remotely mask-controlled by common expanded information elements (at a time). For this reason, in the present embodiment, the number of the command bits per model is made (compressed to) 2 bits.

For example, looking at the command bits a2 and a1, the bit a2 indicates the fixing/nonfixing, and the bit a1 indicates the full rate/half rate (dual rate). When viewing this command as a whole, it can be understood that a2, a1=00 means to maintain the current condition (full rate) or set to full rate, a2, a1=01 means to set to half rate, a2, a1=10 means to fix to full rate, and a2, a1=11 means to fix to half rate. The same is true also for the other commands b to t.

At step S14 (FIG. 4B), the current contents (commands) of the temporary buffer MB (p) and the previous contents (commands) of the temporary buffer MB (p±1) are compared, and it is decided whether the result of the comparison is a match. Incidentally, the symbol "±" denotes an EXOR processing, and "1" denotes an address such as a relative 100 address. Accordingly, the pointer p=relative 0 address (MB<1>) means the comparison with the contents of the relative 100 address. (MB<2>), and the pointer p=relative 100 address (MB<2>) means the comparison with the contents of the relative 0 address (MB<l>).

Further, although not illustrated, at the time of this comparison, in for example the mobile telecommunication unit MS1A, the manufacturer information and/or model information in the memory 62b are further referred to. As the result, only the command bits a2 and a1 in each of the expanded information elements at the previous time and at the present time are compared. Namely, in the comparison performed in the mobile telecommunication unit MS1A, the other commands b to t are not relevant. In this way, the network side can perform the remote masking control for the different manufacturers and models all together.

When the result of comparison is not a match, the flow of processing proceeds to step S23 (FIG. 4B), at which the comparison counter c is made 0. Namely, if the result becomes noncoincidence even once, the comparison is repeated from the first. Accordingly, a forward protection for confirming the command is attained. Further, when the result of the comparison is a match, the comparison counter c is incremented by one at step S15. At step S16,.it is decided whether c=2. When c=2, this means that the same command is continuously received three times in the home network, therefore the flow of processing proceeds to step S17, at which the processing is branched according to the bit a1 of the received command at present.

When bit a1=0, the command is to set the full rate (or maintain the current condition), therefore 0 (full rate) is written in the mode flag MDF at step S18. Further, when bit a1=1, the command is to set the half (dual) rate, therefore 1 (half rate) is written in the mode flag MDF at step S19.

At step S20, the bit a2 in the currently received command is checked. When the bit a2 is 1 (fixed), 1 (fixed) is written in the fixed flag FXF at step S21. In this case, the fixed flag FXF becomes 1 by the decision at the next step S4, therefore this is not input again in the masking control processing after step S11. Namely, the mobile telecommunication unit MS1A is fixed to the full rate or half rate (dual rate). Further, the processing after step S11 is not carried out after this, so the processing load of the CPU 61 is greatly reduced. On the other hand, the carriers can use the expanded information elements in the broadcast information for other purposes.

Further, when the bit a2 is 0 (not fixed), the processing of step S21 is skipped. In this case, the fixed flag FXF becomes 0 by the decision at the subsequent step S4. This is input again in the masking control processing after step S11. Namely, in this state, the mobile telecommunication unit MS1A can be still freely set again to the full rate (actual condition is held) or half rate (dual rate). At step S22, the pointer P is updated, and the current temporary buffer and previous temporary buffer are switched. Then, the flow of processing returns to step S2 or S5.

Note that, the contents and configuration of the command bits a2 and a1 are not limited to those described above. For example, it is possible for example to use two bits to form one command code and make the codes a2 and a1=00 mean to maintain the actual condition, codes a2, a1=01 mean to fix to full rate, codes a2, a1=10 mean to fix to half (dual) rate, and code a2, a1=11 mean reserve.

In this case, the commands can be independently handled for each code without dividing the same into their component bits. For example, the command for maintaining the current condition is recognized by even one reception and can be handled to maintain the full rate of the current condition (state where the half rate function is masked). Further, it is also possible to program the mobile telecommunication unit so that at least the information of the history indicating that the command for maintaining the current condition was normally received can be extracted by an external apparatus 200 or the like. On the other hand, the commands for fixing the unit to a full rate or a half (dual) rate are recognized by three continuous receptions similar to that described above and thereby the unit can be handled to be fixed to a full rate unit or a half (dual) rate unit.

Further, in the above embodiment, the number of the expanded information elements in the broadcast information was made 5 octets and the number of the command bits was made 2 bits, but the numbers are not limited to them. Any number of the expanded information elements may be used and also any number of the command bits may be used. For example, it is also possible to set the number of the command bits to 3 bits or more and divide the fixed/not fixed commands in these bits.

Thus, if such a mobile telecommunication unit is released on the market in advance, the risk accompanying the enhancement of functions of the mobile telecommunication network can be effectively avoided and, at the same time, the entire mobile telecommunication network can be smoothly enhanced in its functions. In this case, the carrier A providing the above service sets a constant preparation period before the enhancement of functions, and places a command for maintaining the current condition in the broadcast information in this preparation period, and broadcasts this to the interior of its network. The command for maintaining this current condition does not cause any change of the mask for the mobile telecommunication units, but makes it possible to confirm in advance whether the masking control processing for the same type of mobile telecommunication unit normally operates by using an appropriate pilot unit. A suitable time later in another constant period, a command for fixing the mask release is placed in the broadcast information and broadcast to the interior of the network. In this period, a large number of mobile telecommunication units of the related network will probably roam in the home network. Accordingly, the entire mobile telecommunication network is smoothly enhanced in its functions and then can be semi-permanently fixed. After this, the broadcast instructing the fixing of the mask release is stopped. The carriers can use the expanded information elements of the broadcast information for other purposes after this.

In this regard, note that there are cases where it is desirable to reset and fix a mobile telecommunication unit which has been fixed once in function by the remote masking control, to another mode unit or to release the fixed state to enable the remote masking control once again. In such cases, in FIGS. 2A and 2B, the mobile telecommunication station 10 is connected to an external apparatus 200 via the connector 8 thereof and the following masking control processing is locally carried out.

Figure 6A:
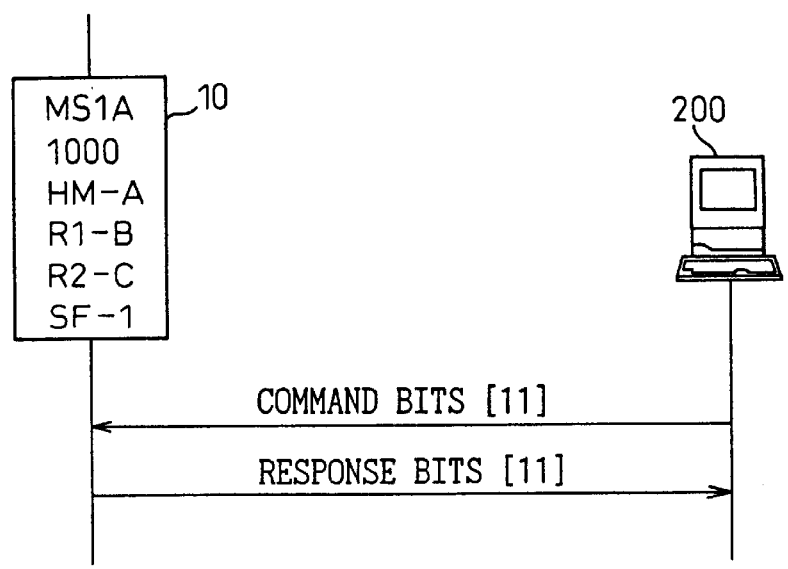
FIGS. 6A, 6B, and 6C are views explaining a local masking control processing in the mobile telecommunication station according to the embodiment of the present invention.
Figure 6B:
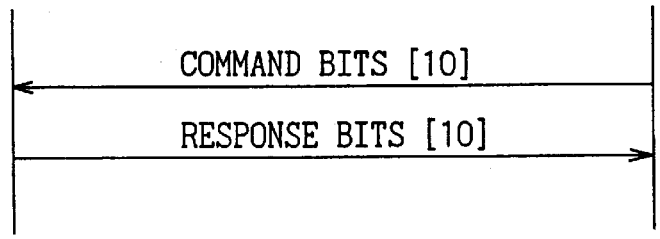
Figure 6C:
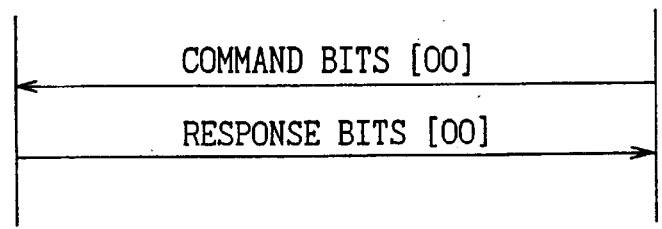

FIGS. 6A, 6B, and 6C are views explaining the local masking control processing in a mobile telecommunication station according to the embodiment of the present invention. The communication between the external apparatus 200 and the mobile telecommunication unit 10 is carried out based on a predetermined serial communication protocol (RS232C etc.)

FIG. 6A shows the processing in the case of fixing a mobile telecommunication unit which has been fixed in function as a full rate unit to the function as a half (dual) rate unit.

A command frame of a predetermined format is transmitted from the external apparatus 200. Command information composed of the command bits a2, a1=11 (fix to half rate) are contained in this. The mobile telecommunication unit 10 receiving this writes the mode flag MDF=1 (half rate unit) inside this and then writes the fixed flag FXF=1 (fixed). Then, it transmits a response frame of a predetermined format to the external apparatus 200. This includes response bit information [11] corresponding to the command bits a2, a1=11 for the confirmation by the external apparatus 200. The mobile telecommunication unit is fixed in its function to a half (dual) rate unit in this manner.

FIG. 6B shows the processing in the case of fixing a mobile telecommunication unit fixed in function to a half (dual) rate unit to the function of a full rate unit.

A command frame including the command bits a2, a1=10 (fix to full rate) is transmitted from the external apparatus 200. The mobile telecommunication unit 10 receiving this writes the mode flag MDF=0 (full rate unit) inside this and then writes the fixed flag FXF=1 (fixed). Then, it transmits a response frame containing the response bit information [10] corresponding to the command bits a2, a1=10 to the external apparatus 200. The function of this mobile telecommunication unit is fixed to a full rate unit in this way.

FIG. 6C shows the processing in the case of releasing the fixed state of a mobile telecommunication unit which has been fixed in function.

A command frame containing the command bits a2, a1=00 (set to full rate) is transmitted from the external apparatus 200. The mobile telecommunication unit 10 receiving this writes the mode flag MDF=0 (full rate unit) inside this and then writes the fixed flag FXF=0 (not fixed). Then, it transmits the response frame containing the response bit information [00] corresponding to the command bits a2, a1=00 to the external apparatus 200. The mobile telecommunication unit is restored to the state at the time of sale in this way. Accordingly, it becomes able to receive the remote masking control service via the broadcast information again.

A variety of local command controls other than this are possible as well. Further, it is also possible to perform batch processing with respect to the programs of for example the CPU 61 and DSP 21, processing for replacing the programs, and processing for changing to other various data.

Note that, in the above embodiment, predetermined air interface information was defined as the broadcast information, but the broadcast information is not limited to this. Needless to say any already existing other air interface information or new air interface information to be provided in the future which are provided with the expanded information elements usable in the present invention can be utilized.

Further, the above embodiment was explained with reference to a mobile telecommunication station (unit) using the TDMA mode, but the present invention is not limited to this communication mode. For example, the FDMA mode or CDMA mode can be adopted too.

Further, the above embodiment was explained with reference to a function enabling means realized by a codec (voice coding unit), but the function enabling means is not limited to this. It goes without saying that all types of function enhancement enabling means, new function addition means, etc. accompanying the provision of a new service from the network side are included.

Further, in the above embodiment, the set/release control of the mask was carried out by software, but it is also possible to perform this by hardware.

Further, while a preferred embodiment of the present invention was mentioned, needless to say various changes may be made to the configuration of the parts, control procedures, and combinations of them to an extent not departing from the concept of the present invention.

As explained above, according to the present invention, the risk accompanying the enhancement of functions of a mobile telecommunication network can be effectively avoided and, at the same time, the functions of the entire mobile telecommunication network can be smoothly enhanced, therefore the present invention contributes much to the expansion, improvement of level, and safe operation of mobile telecommunication systems.

What is claimed is:

1. A mobile telecommunication station configured for connection to a mobile telecommunication network and which receives mobile telecommunication services from the network, comprising:

function enabling means for enabling a selected function among a plurality of selectable functions in the mobile telecommunication station, wherein each of the selectable functions is masked in advance and a selected function is enabled by release of a mask; and masking control means for watching for predetermined air interface information from the mobile telecommunication network and releasing the mask corresponding to the selected function according to an instruction, wherein the predetermined air interface information is part of extended information elements of air interface information.

2. A mobile telecommunication system, comprising:

a mobile telecommunication station comprising a function enabling unit enabling a selected function among a plurality of selectable functions in the mobile telecommunication station, wherein each of the selectable functions is masked in advance and a selected function is enabled by release of a mask;

a base station sending an instruction, wherein predetermined air interface information is part of extended information elements of air interface information, to the mobile telecommunication station; and said mobile telecommunication station further comprises a masking control unit watching for the predetermined air interface information from the base station and releasing the mask corresponding to the selected function according to said instruction.

3. A mobile telecommunication system, comprising:

a plurality of mobile telecommunications stations, each comprising a function enabling unit enabling a selected function among a plurality of selectable functions in the mobile telecommunication station, wherein each of the selectable functions is masked in advance and a selected function is enabled by release of a mask;

a base station sending an instruction, wherein predetermined air interface information is part of extended information elements of air interface information, to a selected mobile telecommunication station corresponding to the selected function; and said selected mobile telecommunication station further comprises a masking control unit watching for the predetermined air interface information from the base station and releasing the mask corresponding to the selected function according to said instruction.

4. A mobile telecommunication station configured for connection to a mobile telecommunication network and which receives mobile telecommunication services from the network, comprising:

a function enabling unit enabling a selected function among a plurality of selectable functions in the mobile telecommunication station, wherein each of the selectable functions is masked in advance and a selected function is enabled by release of the respective mask; and a masking control unit watching for predetermined air interface information, having a mask release instruction, from the mobile telecommunication network and releasing the mask corresponding to the selected function according to the mask release instruction, when received, wherein the predetermined air interface information is part of extended information elements of air interface information.

5. A mobile telecommunication system, comprising:

a mobile telecommunication station comprising a function enabling unit enabling a selected function among a plurality of selectable functions in the mobile telecommunication station, wherein each of the selectable functions is masked in advance and a selected function is enabled by release of the respective mask;

a base station sending a mask release instruction, wherein predetermined air interface information is part of extended information elements of air interface information having a mask release instruction, to the mobile telecommunication station; and said mobile telecommunication station further comprises a masking control unit watching for the predetermined air interface information from the base station and releasing, when received, the mask corresponding to the selected function according to said mask release instruction.

6. A mobile telecommunication system, comprising:

a plurality of mobile telecommunications stations, each comprising a function enabling unit enabling a selected function among a plurality of selectable functions in the mobile telecommunication station, wherein each of the selectable functions is masked in advance and a selected function is enabled by release of the respective mask;

a base station sending an instruction, wherein predetermined air interface information having a mask release instruction is part of extended information elements of air interface information, to a selected mobile telecommunication station corresponding to the selected function; and said selected mobile telecommunication station further comprises a masking control unit watching for the predetermined air interface information from the base station and, when received, releasing the mask corresponding to the selected function according to said mask release instruction.

* * * * *